(12) United States Patent
Hatano et al.

(10) Patent No.: US 6,836,822 B1
(45) Date of Patent: Dec. 28, 2004

(54) APPARATUS FOR AND METHOD OF RETRIEVING INFORMATION

(75) Inventors: Ichiro Hatano, Tokyo-to (JP); Motohiko Takayanagi, Tokyo-to (JP); Koji Koga, Tokyo-to (JP); Tadayasu Kaneko, Tokyo-to (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/244,019

(22) Filed: Feb. 4, 1999

(30) Foreign Application Priority Data

Feb. 6, 1998  (JP) ............................. 10-041075

(51) Int. Cl.[7] .......................... G06F 12/00; G06F 13/00
(52) U.S. Cl. ...................... 711/117; 711/100; 711/118; 711/154; 701/209
(58) Field of Search ............................. 711/100, 117, 711/119, 154, 118; 701/209, 211

(56) References Cited

U.S. PATENT DOCUMENTS

| | | | | |
|---|---|---|---|---|
| 3,964,054 A | * | 6/1976 | Annunziata et al. | ........ 711/122 |
| 5,696,916 A | * | 12/1997 | Yamazaki et al. | .......... 345/356 |
| 5,761,637 A | * | 6/1998 | Chino | ......................... 704/231 |
| 5,839,088 A | * | 11/1998 | Hancock et al. | ............ 701/213 |
| 5,901,214 A | * | 5/1999 | Shaffer et al. | .............. 379/220 |
| 5,978,732 A | * | 11/1999 | Kakitani et al. | ............ 701/209 |
| 6,081,750 A | * | 6/2000 | Hoffberg et al. | .............. 700/17 |
| 6,104,980 A | * | 8/2000 | Sato et al. | .................. 701/211 |
| 6,415,227 B1 | * | 7/2002 | Lin | ............................. 701/213 |

* cited by examiner

*Primary Examiner*—Tuan V. Thai
(74) *Attorney, Agent, or Firm*—Young & Thompson

(57) ABSTRACT

An information retrieving apparatus is advantageously used in a voice operation of a vehicle navigation system. The apparatus includes a storage unit for storing the plural pieces of the candidate information composing a hierarchical structure including m hierarchies (m is a natural number not less than 2), and the apparatus retrieves a target information from the hierarchical structure. The apparatus includes an input unit for inputting information, a judging unit for judging a correspondence of the inputted information with one of the plural pieces of the candidate information and for judging the hierarchy of the candidate information if the correspondence is obtained, and a retrieving unit for retrieving one of the plural pieces of the candidate information as a target information based on a judged result of the judging unit.

27 Claims, 13 Drawing Sheets

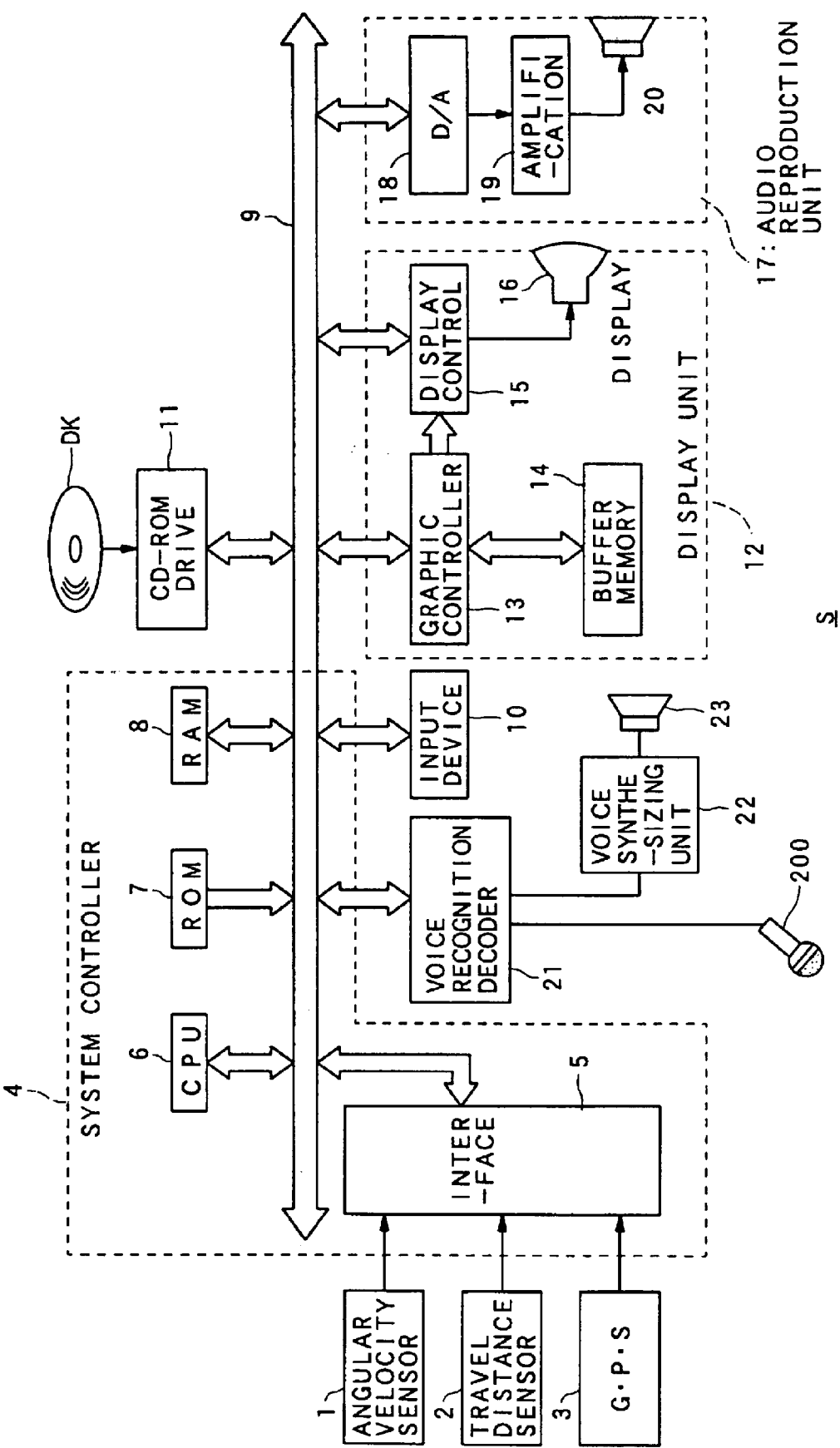

FIG. 2A

REQUEST MESSAGE SM

| | | | | |
|---|---|---|---|---|
| ZERO HIERARCHY | "WHERE ARE YOU GOING?" | | | — 50 |
| FIRST HIERARCHY | ONE OF "PREFECTURE" "AREA CODE" "GENRE", PLEASE. "RECENTLY RETRIEVED ADDRESS" "REGISTERED ADDRESS" | | | — 51 |
| SECOND HIERARCHY | "PREFECTURE, PLEASE" 52 | "AREA CODE, PLEASE" 55 | "ADDRESS, PLEASE" 58 | "STATION, AMUSEMENT PARK, FREEWAY FACILITY, GOLF COURSE, SKI AREA OR THE OTHERS?" — 61 |
| | | | | "ACCOMMODATION FACILITY, HOSPITAL PARK, EDUCATIONAL FACILITY, CAMPSITE OR THE OTHERS?" — 62 |
| | | | | "RESORT FACILITY, PUBLIC OFFICE, FERRY TERMINAL OR AIRPORT?" — 63 |
| THIRD HIERARCHY | "CITY NAME, PLEASE" 53 | "CITY TELEPHONE NUMBER PLEASE" 56 | "○○, ××, △△, ◆◆, ◎◎ OR THE OTHERS?" 59 ●●, ▲▲, ▽▽, □□, OR ⊗⊗?" 60 | ACCESS AREA 52 — 64 |
| FOURTH HIERARCHY | "ADDRESS, PLEASE" 54 | "REMAINING PART OF THE NUMBER, PLEASE" 57 | | ACCESS AREA 53 — 65 |
| FIFTH HIERARCHY | | | | ACCESS AREA 54 — 66 |

RECOGNITION WORDS

| | | "PREFECTURE NAME" "AREA CODE" "REGISTERED ADDRESS" "RECENTLY RETRIEVED ADDRESS" "GENRE" | | |
|---|---|---|---|---|
| 40 | FIRST HIERARCHY | | | |
| 41 | SECOND HIERARCHY | REAL NAME OF PREFECTURE <u>71</u> | AREA CODE <u>74</u> | ADDRESS <u>77</u> |
| 42 | THIRD HIERARCHY | REAL NAME OF CITY <u>72</u> | CITY TELEPHONE NUMBER <u>75</u> | "○○" "××" "△△" "◆" "◎" "▲▲" "▽▽" "●" "□□" "THE OTHERS" "◇◇" | "STATION" "AMUSEMENT PARK" "FREEWAY FACILITY" "GOLF COURSE" "SKI AREA" "THE OTHERS" |
| 43 | FOURTH HIERARCHY | REAL NAME OF ADDRESS <u>73</u> | REMAINING PART OF THE NUMBER | | "ACCOMMODATION FACILITY" "HOSPITAL" "PARK" "EDUCATIONAL FACILITY" "CAMPSITE" "THE OTHERS" |
| 44 | FIFTH HIERARCHY | | | | "RESORT FACILITY" "PUBLIC OFFICE" "FERRY TERMINAL" "AIRPORT" |

(Additional labels: 70, 76, 78, 79, 80, 81, 82 ACCESS AREA 71, 83 ACCESS AREA 72, 84 ACCESS AREA 73)

APPARATUS FOR AND METHOD OF RETRIEVING INFORMATION

BACKGROUND OF THE INVENTION

1. Field of the Invention

The present invention relates to a technical field of an information retrieval apparatus for retrieving information such as a destination spot in a navigation device which displays a travel route of a mobile object such as a vehicle, names of famous places around the travel route and the like as well as a map so as to assist the driving of the mobile object.

2. Description of Related Art

At present, there is known a navigation device, which displays a position mark (guide mark) representing a current position of a mobile object on a map so as to guide a travel route to a destination spot based on the displayed map, as a position measuring device used for various mobiles such as a vehicle, an aircraft and a vessel. In such navigation devices, vehicle navigation devices to be mounted on vehicles are roughly divided into two types: a stand-alone type navigation device and a GPS (Global Positioning System) type navigation device.

The stand-alone type navigation system obtains a travel direction and a travel distance of a vehicle by means of independent sensors such as a speed sensor and an angular velocity sensor provided on the vehicle, and then calculates a current position of the vehicle by successively adding the obtained travel direction and travel distance to a reference point so as to display a position mark and a corresponding map on a display screen based on the calculated current position.

The GPS type navigation system receives a position measuring radio waves from a plurality of GPS satellites launched into space via a GPS receiver, and calculates a current position of the vehicle by a three-dimensional measuring method or a two-dimensional measuring method based on the received result so as to display a position mark and a corresponding map on a display screen based on the calculated current position.

Further, a so-called hybrid-type vehicle navigation device having both functions of the above-mentioned stand-alone type and GPS types navigation systems is recently known.

In addition, among the above respective vehicle navigation devices, there is also known a navigation device for superposing a scheduled travel route, which the vehicle plans to follow, on a map to be displayed together with famous places around the travel route.

According to the above respective vehicle navigation devices, since a user (i.e., driver) can know a current position of the vehicle and a map around the current position in connection with each other, he or she can reach the destination without getting lost even if he or she goes to the area for the first time.

On the other hand, in the above-mentioned vehicle navigation device, there is a case, for example, that the driving is started after a destination spot is set and a travel route to the destination spot is determined in advance. At this time, in setting the destination spot, a plurality of destination candidates are arranged in a hierarchical data structure, and the particular destination spot is set by successively searching the hierarchical structure for that particular destination in an interactive manner with the user.

Namely, according to the vehicle navigation device having the destination spot setting function, when a destination spot is set concretely, plural types of destination attribute names (for example, attribute names representing types of destination spots such as a golf course, a theme park and a restaurant. The hierarchy of the destination candidates composed of the attribute names is the first hierarchy) are first displayed, and the user selects a target attribute of the destination spot from those plural attribute names. Then, plural names of prefectures (the hierarchy of the destination candidates composed of prefecture names is the second hierarchy) in which facilities including the target destination spot exist are displayed. When a name of the target prefecture where the destination spot exists is selected, plural names of areas in the target prefectures (for example, the names of areas such as northern part and southern part. The hierarchy of the spot candidates including the area names is the third hierarchy) are displayed so that a name of a target area where the destination spot exists is selected from the plural area names. Next, plural names of cities/towns/villages existing in the target area (the hierarchy of the spot candidates including the names of cities/towns/villages is the fourth hierarchy) are displayed, and a name of the target city/town/village where the destination spot exists is selected. Then, finally, plural names of concrete facilities having the target attribute selected previously in the selected city/town/village are displayed as destination candidates, and the destination spot is selected from those displayed names of the facilities and set.

However, in the case where the above-described destination spot setting function of the, vehicle navigation device is used, a driver needs to change the displayed prefecture names until a desired prefecture name is displayed in order to select the prefecture name included in the second hierarchy, for example. Therefore, there arose a problem that unnecessary time is required for searching the target prefecture name.

As for this problem, in the vehicle navigation device capable of inputting information by using a voice recognizing function which is being put into practical use recently, all candidate names of prefectures should be vocally reproduced by the device until a desired prefecture name comes out. As a result, the required time becomes unnecessarily long and the driving is hindered because many unnecessary voices are heard.

Further, according to the above-mentioned destination spot setting function, it is always necessary to start selecting candidates from the first hierarchy then down to the deeper hierarchies. In this case, for example, even if a user already knows a name of city/town/village where the destination spot exists (belonging to the fourth hierarchy), the driver should unnecessarily start the selecting operation from the uppermost hierarchy, and hence unnecessary operation should be made.

SUMMARY OF THE INVENTION

In view of the above, an object of the present invention is to provide an information retrieving apparatus and an information retrieving method, which are capable of retrieving a desired destination spot information quickly, accurately and conveniently in a navigation device having a destination spot setting function using spot candidates data of hierarchical structure.

According to one aspect of the present invention, there is provided an information retrieving apparatus for retrieving target information from plural pieces of candidate information, including: a storage unit for storing the plural pieces of the candidate information in a hierarchical structure including m hierarchies (m is a natural number not less than 2): an input unit for inputting information; a judging unit for judging a correspondence of the inputted information with one of the plural pieces of the candidate information and for judging the hierarchy of the candidate information if the correspondence is obtained; and a retrieving unit for retrieving one of the plural pieces of the candidate information as a target information based on a judged result of the judging unit.

In accordance with the apparatus thus configured, the storage unit stores the plural pieces of the candidate information in a hierarchical structure including m hierarchies. A user can input information via the input unit. Then, the judging unit judges a correspondence of the inputted information with one of the plural pieces of the candidate information, and then judges the hierarchy of the candidate information if the correspondence is obtained. Thereafter, the retrieving unit retrieves one of the plural pieces of the candidate information as a target information based on a judged result of the judging unit.

Therefore, since a hierarchy of inputted candidate information is judged first and then the information is retrieved based on the judged result, it is possible to retrieve target information in the order of hierarchies, or alternatively possible to retrieve target information while skipping one or plural hierarchies and jumping from a hierarchy to a hierarchy. Consequently, a desired target information can be retrieved conveniently in the information retrieval apparatus.

The hierarchical structure may be arranged such that each piece of the candidate information belonging to (n+1)-th hierarchy (n is a natural number and n<m−1) is associated with one of the plural pieces of the candidate Information belonging to n-th hierarchy. With this arrangement, if candidate information in the upper hierarchy are different, candidate information in the lower hierarchy corresponding to the candidate information in the upper information are different. Therefore, the hierarchical structure can be constituted to include plural types of candidate information.

It is preferred that the information retrieving apparatus further includes an output unit for outputting input request information which requests a user to input an input information corresponding to the candidate information belonging to one hierarchy of the hierarchical structures, wherein the output unit includes: a unit for outputting the input request information requesting the input of the candidate information belonging to the (p+1)-th hierarchy if the candidate information belonging to the p-th hierarchy is inputted in response to the input request information requesting the input of the candidate information belonging to the p-th hierarchy (p is a natural number and p<m−1); and a unit for outputting the input request information requesting the input of the candidate information belonging to the (p+q+1)-th hierarchy if the candidate information belonging to the (p+q)-th hierarchy is inputted in response to the input request information requesting the input of the candidate information belonging to the p-th hierarchy (q is a natural number and (p+q)<m−1). This enables the retrieval in the order of the hierarchical structure or alternatively enables the retrieval with jumping between the hierarchies.

In addition, the output unit may further include a unit for outputting the input request information requesting the input of the candidate information in r-th hierarchy (r is a natural number and r<m−1) if no candidate information is inputted for a predetermined time in response to input request information requesting the input of the candidate information belonging to the r-th hierarchy. With this arrangement, if no input in response to the input request information of a hierarchy is made, another input request information of the lower hierarchy is outputted, thereby accelerating the retrieval of the target information.

It a preferred embodiment, the candidate information may include a plurality of candidate information groups each including the plural pieces of the candidate information in one hierarchy, wherein the candidate information included in one candidate information group is different from the candidate information included in another candidate information groups, and wherein, if no input information corresponding to the candidate information is inputted for a predetermined time in response to input request information requesting the input of the candidate information included in one candidate information group, the output unit outputs the input request information requesting the input of the candidate information included in a candidate information group other than the one candidate information group.

With this arrangement, an output of one input request information can be rapidly made. In addition, the desired candidate information can be inputted without the need to output all candidate information in one hierarchy.

The output unit may output the input request information in a form of voice, wherein the information inputted through the input unit is voice information, and wherein the input unit includes a voice recognition unit for recognizing a content of the inputted voice information. This achieves safer and more convenient input of information.

According to another aspect of the present invention, there is provided an information retrieving apparatus for retrieving target information from plural pieces of candidate information, including: a storage unit for storing the plural pieces of the candidate information in a hierarchical structure including a plurality of hierarchies; an input unit for inputting information; a determining unit for determining the candidate information corresponding to the inputted information; and a retrieving unit for retrieving one of the plural pieces of candidate information which belong to the lower hierarchy of the determined candidate information and are associated with the determined candidate information. Consequently, a desired target information can be retrieved conveniently in the information retrieval apparatus.

According to still another aspect of the present invention, there is provided a method of retrieving target information from plural pieces of candidate information composing a hierarchical structure including m hierarchies (m is a natural number not less than 2), wherein the hierarchical structure is arranged such that each piece of the candidate information belonging to (n+1)-th hierarchy (n is a natural number and n<m−1) is associated with one of the plural pieces of the candidate information included in n-th hierarchy, the method including the steps of: receiving voice information; judging a correspondence of inputted voice information with one, of the plural pieces of the candidate information and judging the hierarchy of the candidate information if the correspondence is obtained; and retrieving one of the plural pieces of the candidate information as a target information based on a judged result of the judging step.

In accordance with the apparatus thus configured, the plural pieces of the candidate information are stored in a hierarchical structure including m hierarchies. An input information is received, and then a correspondence of the inputted information with one of the plural pieces of the candidate information is judged. Then, the hierarchy of the candidate information is judged if the correspondence is obtained. Thereafter, one of the plural pieces of the candidate information is retrieved as a target information based on a judgement result.

Therefore, it is possible to retrieve target information in the order of hierarchies, or to retrieve target information while skipping one or plural hierarchies and jumping from a hierarchy to a hierarchy.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1 is a schematic block diagram showing the configuration of the vehicle navigation apparatus according to the present invention.

FIGS. 2A and 2B are schematic diagrams showing the hierarchical structure of request messages and recognition words, respectively.

DETAILED DESCRIPTION OF THE PREFERRED EMBODIMENT

Figure 3:
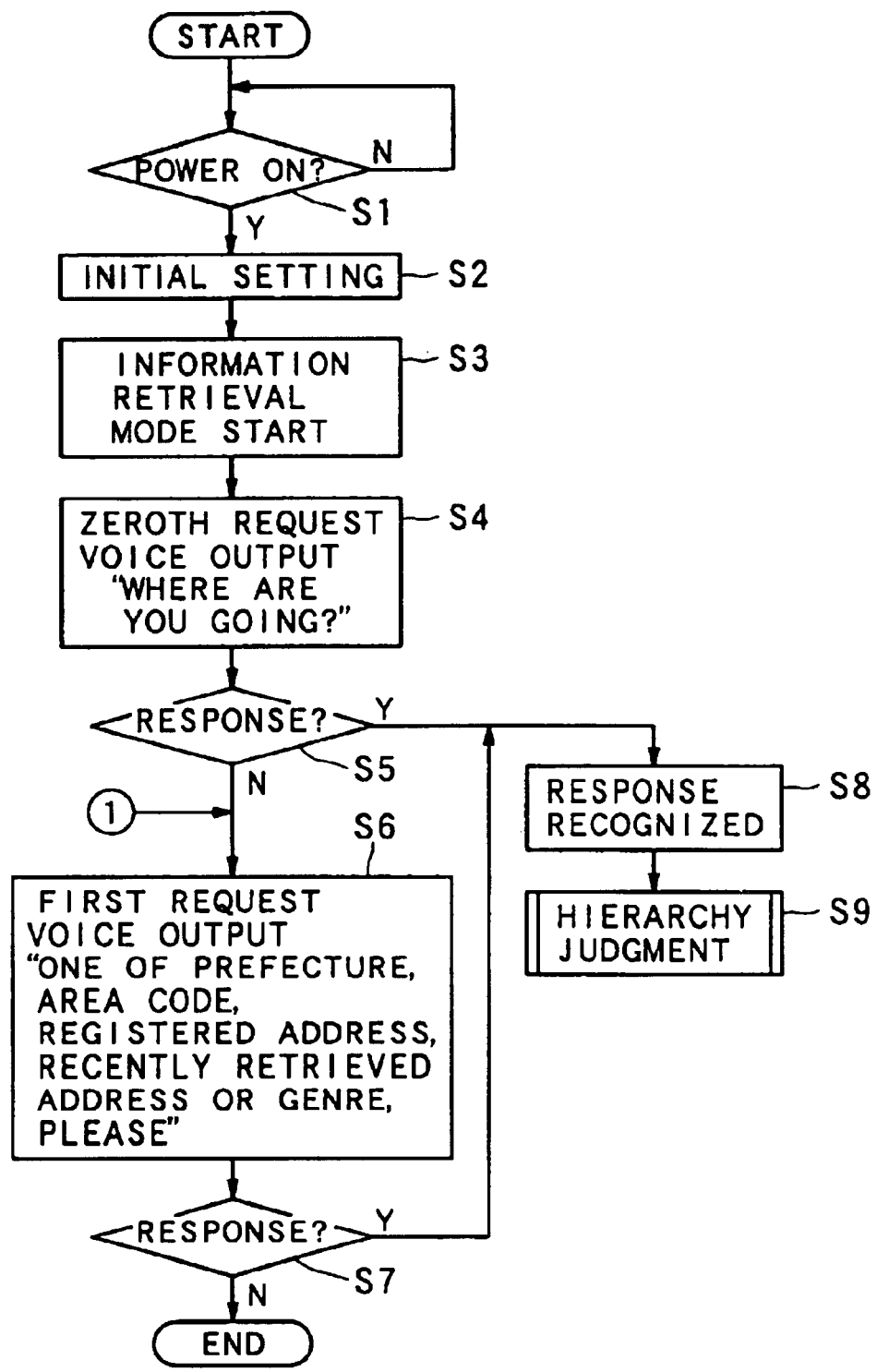
FIG. 3 is a flowchart showing a main routine of information % retrieving process according to an embodiment of the present invention.

The preferred embodiment of the present invention will be described below. It is noted that the embodiment described below is directed to the case where the present invention is applied to a vehicle navigation device which has a voice recognition function and a voice synthesizing function and is capable of inputting/outputting information as voice.

At first, the configuration of the vehicle navigation device according to the present embodiment will be described below with reference to FIG. 1.

As shown in FIG. 1, a vehicle navigation device S is provided with an angular velocity sensor 1, a travel distance sensor 2, a GPS receiver 3, a system controller 4, an input unit 10 such as a remote control unit, a DVD-ROM drive 11, a display unit 12, an audio reproduction unit 17, a voice recognition decoder 21, a voice synthesizing unit 22 and a speaker 23. The angular velocity sensor 1 detects an angular velocity of rotation of an vehicle so as to output angular velocity data and relative orientation data. The travel distance sensor 2 calculates a pulse number per rotation of wheels by counting a pulse number in a pulse signal of a predetermined period outputted according to rotation of the wheels so as to output travel distance data based on the pulse number per rotation. The GPS receiver 3 receives radio waves from GPS satellites so as to output GPS position measuring data and absolute orientation data indicating the advancing direction of the vehicle. The system controller 4 controls the whole navigation device based on the relative orientation data, the angular velocity data, the travel distance data, the GPS position measuring data and the absolute orientation data. The input unit 10 is used by a user or driver to input various data. The DVD-ROM drive 11 reads out and outputs various data such as map data including road data representing a number of traffic lanes, road widths and the like and data representing names of facilities and detailed information from a DVD-ROM (DVD-Read Only Memory) disk DK under the control by the system controller 4. The display unit 12 displays the various display data under the control by the system controller 4. The audio reproduction unit 17 reproduces and outputs various voice data under the control by the system controller 4. The voice recognition decoder 21 recognizes contents of voices inputted from an external microphone 200. The voice synthesizing unit 22 synthesizes voices based on the voice data outputted from the voice recognition decoder 21. The speaker 23 outputs a synthesized voice signal outputted from the voice synthesizing unit 22 to be audible to the user or driver.

The system controller 4 includes an interface unit 5, a CPU 6 as a computer, a ROM (Read Only Memory) 7 and a RAM 8. The interface unit 5 performs an interface operation with the external sensors such as the GPS receiver 3. The CPU 6 controls the whole system controller 4. The ROM 7 stores a basic control program and the like for controlling the CPU 6. The RAM 8 has a non-volatile memory, not shown, and stores various data, such as route data which has been set in advance by a user via the input unit 10 and data necessary for the processing in the CPU 6 in rewritable manner. The system controller 4 is connected with the input unit 10, the DVD-ROM drive 11, the display unit 12, the audio reproduction unit 17 and the voice recognition decoder 21 via a bus line 9. The control program for the information retrieving process, described later, executed by the CPU 6 is recorded beforehand in the DVD-ROM disk DK and is read out by the DVD-ROM drive 11 when it becomes necessary.

The display unit 12 includes a graphic controller 13, a buffer memory 14, a display control unit 15 and a display 16. The graphic controller 13 controls the whole display unit 12 based on the control data transmitted from the CPU 6 via the bus line 9. The buffer memory 14 may be composed of a memory such as a VRAM (Video RAM), and temporarily stores image information which can be displayed immediately. The display control unit 15 controls the display 16 composed of a liquid crystal display device, a CRT (Cathode Ray Tube) display device or the like based on image data outputted from the graphic controller 13.

The audio reproduction unit 17 includes a D/A converter 18, an amplifier 19 and a speaker 20. The D/A converter 18 converts digital voice data transmitted from the DVD-ROM drive 11 or the RAM 8 via the bus line 9 into analog voice signal. The amplifier 19 amplifies the analog voice signal outputted from the D/A converter 18. The speaker 20 converts the amplified analog voice signal into a voice so as to be outputted as an audible voice message from the navigation device.

The voice recognition decoder 21 has a voice recognition circuit for recognizing human voice. When a spoken word is inputted via the external microphone 200, a candidate word which is closest to the spoken word is selected from an internal dictionary including information representing many words, and candidate word data representing the selected candidate word are outputted to the CPU 6 via the bus line 9. Here, the internal dictionary may be stored in the DVD-ROM disk DK and read out by the DVD-ROM drive 11 according to needs.

In the vehicle navigation device S having the above-mentioned configuration, when a user inputs spot information or the like representing a destination spot via the external microphone 200 in the course of the processing procedure described later, the candidate word corresponding to the inputted word is retrieved by the voice recognition decoder 21, and map data or the like stored in the DVD-ROM disk DK are read out by the system controller 4 based on the retrieved candidate word so as to be displayed on the display unit 12.

Of course, a destination spot or the like may be inputted by the input unit 10. Alternatively, however, such information may be inputted easily by voice input to dispense with an operation by buttons or the like on the input unit 10.

In addition, in the vehicle navigation device S shown in FIG. 1, plural kinds of place names or facility names which are frequently set as a destination spot may be selected and registered, in advance, in the RAM 8 together with a number of times at which they are selected and adopted as the destination spot.

In addition, a plurality of place names or facility names which have been retrieved recently and set as a destination spot may be stored in the RAM 8.

Next, with reference to FIGS. 2A and 2B, the description will be given of the data structures of request message data used for voice output from the speaker 23 and recognition words used for recognizing a voice inputted via the external microphone 200 (namely, a voice recognizing data corresponding to words to be inputted).

First, the description will be given of the data structure of the request message data with reference to FIG. 2A. Here, a voice to be outputted from the speaker 23 in the present embodiment is a request message for requesting the user to input information by notifying the user of the content of the information to be inputted next, and 2A shows the data structure of the request messages. The voice data to be outputted as the request message shown in FIG. 2A are recorded beforehand in the DVD-ROM disk DK, and they are read out by the DVD-ROM drive 11 according to need. The method of using respective messages will be described later by referring to flowcharts.

As shown in FIG. 2A, the request message SM of the present embodiment is classified into six hierarchies.

Voice data, which are used for outputting a message "Where are you going ?" just after the power-on of the vehicle navigation device S (more specifically, when an ignition switch of the vehicle is turned on), are stored in an area 50 in a zeroth hierarchy 30 which is the most significant hierarchy.

Next, voice data for outputting a message "One of prefecture, area code, registered address, genre and recently retrieved address, please. ", which should be outputted via the speaker 23 after the request message SM "Where are you going?", are stored in an area 51 of a first hierarchy 31.

Next, voice data for outputting a message "Prefecture, please., which is associated with the word "prefecture" of the message in the area 51, are stored in an area 52 in a second hierarchy 32.

Next, voice data for outputting a message "City name, please.", which is associated with the message in the area 52, are stored in an area 53 in a third hierarchy 33.

In addition, voice data for outputting a message "Address, please.", which is associated with the message in the area 53, are stored in an area 54 in a fourth hierarchy 34.

Next, voice data for outputting a message "Area code, please.", which is associated with the word "area code" of the message in the area 51, are stored in an area 55 in the second hierarchy 32.

In addition, voice data for outputting a message "Area code, please.", which is associated with the message in the area 55, are stored in an area 56 in the third hierarchy 33.

Further, voice data for outputting a message "Remaining part of the phone number, please.", which is associated with the message in the area 56, are stored in an area 57 in the fourth hierarchy 34.

Next, voice data for outputting a message "Address, please. ", which is associated with the word "registered address" and the word "recently retrieved address" in the message in the area 51, are stored in an area 58 in the second hierarchy 32.

In addition, voice data for outputting a message "○○, χχ, ΔΔ, ◆◆, ☺☺, or the others?" as a message of the first segment, which is associated with the message in the area 58, are stored in an area 59 in the third hierarchy 33.

Further, voice data for outputting a message "●●, ▲▲, ▽▽, □□, or ◇◇?" as a message of the second segment, which is associated with the message in the area 58, are stored in an area 60 in the third hierarchy 33.

Here, the above-mentioned "○○", "χχ", "ΔΔ", "◆◆", "☺☺", "●●", "▲▲", "▽▽", "□□", and "◇◇", represent concrete registered addresses which are used frequently or concrete addresses which are different from each other and have been retrieved recently.

Next, voice data for outputting a message "Station, highway, amusement park, golf course, ski area or the others?" as a message of the first segment, which is associated with the word "genre" in the message in the area 51, are stored in an area 61 in the second hierarchy 32.

In addition, voice data for outputting a message "accommodation facility, hospital, educational facility, park, campsite or the others?" as a message of the second segment, which is associated with the word "genre", are stored in an area 62 in the second hierarchy 32.

Further, voice data for outputting a message "Resort facility, public office, ferry terminal or airport?" as a message of the third segment, which is associated with to the word "genre", are stored in an area 63 in the second hierarchy 32.

Next, information suggesting the access to the area 52 in order to output the message ("Prefecture, please.") in the area 52 according to the message in the area 61, 62 or 63, are stored in an area 64 in the third hierarchy 33.

Next, information suggesting the access to the area 53 in order to output the message ("City name, please.") in the area 53 according to the information in the area 64, are stored in an area 65 in the fourth hierarchy 34.

Finally, information suggesting the access to the area 54 in order to output the message ("Address, please.") in the area 54 according to the information in the area 65, are stored in an area 66 in the fifth hierarchy 35.

Here, as is clear from the data structure of the request messages SM, as for the request messages SM in the hierarchies not higher than the second hierarchy 32, request message SM in the upper hierarchy is associated with one request message SM in the lower hierarchy. Therefore, the request message SM in the lower hierarchy is not associated with plural request messages SM in the upper hierarchies.

Next, the description will be given of the data structure of the recognition words W with reference to FIG. 2B. Here, the recognition words in the present embodiment are words used to recognize the voice that a user inputs in response to the request messages SM. FIG. 2B shows a data structure of the recognition words W. The voice data corresponding to the recognition words shown in FIG. 2B are stored beforehand in the DVD-ROM disk DK as the internal dictionary and are read out by the DVD-ROM drive 11 according to need. The method of using the following recognition words will be described later together with flowcharts.

As shown in FIG. 2B, the recognition words W of the present embodiment are classified into five hierarchies so as to correspond to the respective hierarchies of the above request messages SM.

A dictionary, which shows the words "prefectures", "area code", "registered addresses", "genre" and "recently retrieved address" in order to recognize a voice inputted in response to the message in the area 51 in the request messages SM, are stored in an area 70 in a first hierarchy 40 which is the most significant hierarchy.

Next, a dictionary, which shows real names of the prefectures ("Tokyo-To", "Kanagawa-Ken" and the like) associated with the word "prefecture" in the message in the area 70 and used for recognizing a voice inputted in response to the word "Prefecture, please." in the area 52 in the request messages SM, is stored in an area 71 in a second hierarchy 41.

In addition, a dictionary, which shows real names of the city ("Shinagawa-Ku", "Yokohama-Shi" and the like) associated with the word in the area 71 and used for recognizing a voice inputted in response to the word ("City name, please.") in the area 53 in the request message SM, is stored in an area 72 in a third hierarchy 42.

Next, a dictionary, which shows concrete addresses associated with the word in the area 72 and used for recognizing a voice inputted in response to the phrase ("Address, please.") in the area 54 in the request message SM, is stored in an area 73 in a fourth hierarchy 43.

In addition, a dictionary, which shows the area codes ("03", "045" and the like) associated with the word "area codes" in the message in the area 70 and used for recognizing a voice inputted in response to the phrase ("Area code, please.") in the area 55 in the request message SM, is stored in an area 74 in the second hierarchy 41.

Next, a dictionary, which shows the area codes ("111", "987" and the like) associated with the word in the area 74 and used for recognizing a voice inputted In response to the phrase ("Area code, please.") in the area 56 in the request message SM, is stored in an area 75 in the third hierarchy 42.

Further, a dictionary, which shows telephone numbers ("2345", "9876" and the like) associated with the word in the area 75 and used for recognizing a voice inputted in response to the phrase ("Remaining part of the phone number, please.") in the area 57 in the request message SM, is stored in an area 76 in the fourth hierarchy 43.

In addition, a dictionary, which shows concrete addresses associated with the word "registered addresses" and the word "recently retrieved addresses" in the messages in the area 70 and used for recognizing a voice inputted in response to the phrase ("Address, please.") in the area 58, in the request message SM, is stored in an area 77 in the second hierarchy 41.

Next, a dictionary, which shows the concrete words "○○", "χχ", "ΔΔ", "♦♦", "◎◎", and "the others" associated with the word in the area 77 and used for recognizing a voice inputted in response to the phrase ("○○, χχ, ΔΔ, ♦♦, ◎◎ or the others?") in the area 59 in the request message SM, is stored in an area 78 in the third hierarchy 42.

In addition, a dictionary, which shows the concrete words "●●", "▲▲", "▽▽", "□□", and "◊ ◊" associated with the word in the area 77 and used for recognizing a voice inputted in response to the phrase ("●●, ▲▲, ▽▽, □□, or ◊ ◊?") in the area 60 in the request message SM, is stored in an area 79 in the third hierarchy 42.

Next, a dictionary, which shows the words "station", "highway facility", "amusement park", "golf course", "ski area" and "the others" associated with the word "genre" in the message in the area 70 and used for recognizing a voice inputted in response to the phrase ("Station, highway facility, amusement park, golf course, ski area or the others?") in the area 61 in the request message SM, is stored in the area 79 in the second hierarchy 41.

In addition, a dictionary, which shows the words "accommodation facility", "hospital", "educational facility", "park", "campsite and "the others" associated with the word "genre" in the message in the area 70 and used for recognizing a voice inputted in response to the phrase ("Accommodation facility, hospital, educational facility, park, campsite or the others?") in the area 62 in the request message SM, is stored in an area 80 in the second hierarchy 41.

Further, information suggesting the access to the area 71 associated with the word in the area 79, 80 or 81 and used to wait for voice input using the words in the area 71 (real names of the prefectures) in response to the information in the area 64 in the request message SM is stored in an area 82 in the third hierarchy 42.

Next, information suggesting the access to the area 72 associated with the word in the area 82 and used to wait for voice input by using the words (real names of the prefectures) in the area 72 in response to the information in the area 65 in the request message SM is stored in an area 83 in the fourth hierarchy 43.

Next, information suggesting the access to the area 73 associated with the word in the area 83 and used to wait for voice input by using the words (real addresses) in the area 73 in response to the information in the area 66 in the request message SM is stored in an area 84 in the fifth hierarchy 44.

Here, as is clear from the data structure of the recognition words W, as for the recognition words W in the hierarchies not higher than the second hierarchy 41, one recognition word in the upper hierarchy is associated with one recognition word W in the lower hierarchy. Therefore, the recognition word W in the lower hierarchy is not associated with plural recognition words W in the upper hierarchy. Therefore, it is not necessary to wait for voice input using all the recognition words W, and thus it may be enough to wait for voice input using the words in the lower hierarchies associated with the selected words in the upper hierarchies.

Here, even if a voice "Shinagawa-Ku", for example, is inputted in response to the message "Prefecture, please." in the request message SM, it is preferred to recognize this voice input. In order to achieve this, when waiting for voice input after the request message SM in the first hierarchy 31 is outputted, not only the recognition word W in the first hierarchy 40 corresponding to the outputted request message SM but also the respective recognition words in the second, third, fourth and fifth hierarchies 41, 42, 43 and 44 associated with the recognition word W in the first hierarchy 40 may be referred to.

Similarly to this, when waiting for voice input after the request message SM in the second hierarchy 32 associated with the request message SM in the first hierarchy, not only the recognition word W in the second hierarchy 41 corresponding to the outputted request message SM but also the respective recognition words in the third, fourth and fifth hierarchies 42, 43 and 44 associated with the recognition word W in the second hierarchy 41 may be referred to.

Further, when waiting for voice input after the request message SM in the third hierarchy 33 associated with the request message SM in the second hierarchy 32 selected previously is outputted, not only the recognition word W in the third hierarchy 42 corresponding to the outputted request message SM but also the respective recognition words W in the fourth and fifth hierarchies 43 and 44 associated with and according to the recognition word W in the third hierarchy 42 may be referred to.

Next, the information retrieval process according to the present invention using the request messages SM and the recognition words W having the data structure shown in FIGS. 2A and 2B will be described with reference to the flowcharts shown in FIGS. 3 through 12. Here, in the respective flowcharts, "first request voice is outputted", for example, means that a voice corresponding to the message in the first hierarchy 31 in the request messages SM is outputted. Moreover, the operations shown in the respective flowcharts are performed by CPU 6 by reading out and executing the control programs stored in the DVD-ROM disk DK.

As shown in FIG. 3, in the information retrieving process of the present embodiment, at first, when an ignition key or the like of a vehicle is turned on, a judgment is made as to whether or not the power source of the vehicle navigation device S is turned on (step S1). Then, if the power source is not turned on (step S1: NO), the turning-on of the power source is waited, and if the power source is turned on (step S1; YES), the initial setting including initialization of the RAM 8 and the like is executed (step S2).

Thereafter, if an information retrieval mode is started by an input operation via the input unit 10 or the like (step S3), the zeroth request voice "Where are you going?" is outputted through the speaker 23 (step S4).

Next, a judgment is made as to whether or not voice input responding to the zeroth request voice (hereinafter, a voice input in response to respective request voices is simply referred to as "response") is executed (step S5). If a response is made (step S5; YES), a content of the response is recognized by the voice recognition decoder 21 (step S8), and then the hierarchy of the recognition word W corresponding to the content of the response is judged (step S9). The detail of the step S9 will be described later.

On the other hand, if no response is made for a predetermined time set previously in the judgment at step S5 (step S5; NO), the first request voice "One of prefecture, area code, registered address, recently retrieved address or genre, please." is outputted through the speaker 23 (step S6). A judgment is then made as to whether or not a response is made (step S7). If no response is made for a predetermined time (step S7; NO), it is regarded that the driver does not want to execute the information retrieval process so that the information retrieval process is ended. If a response is made at step S7 (step S7; YES), the sequence goes to step S8 to recognize the content of the response, and goes to step S9.

Figure 4:
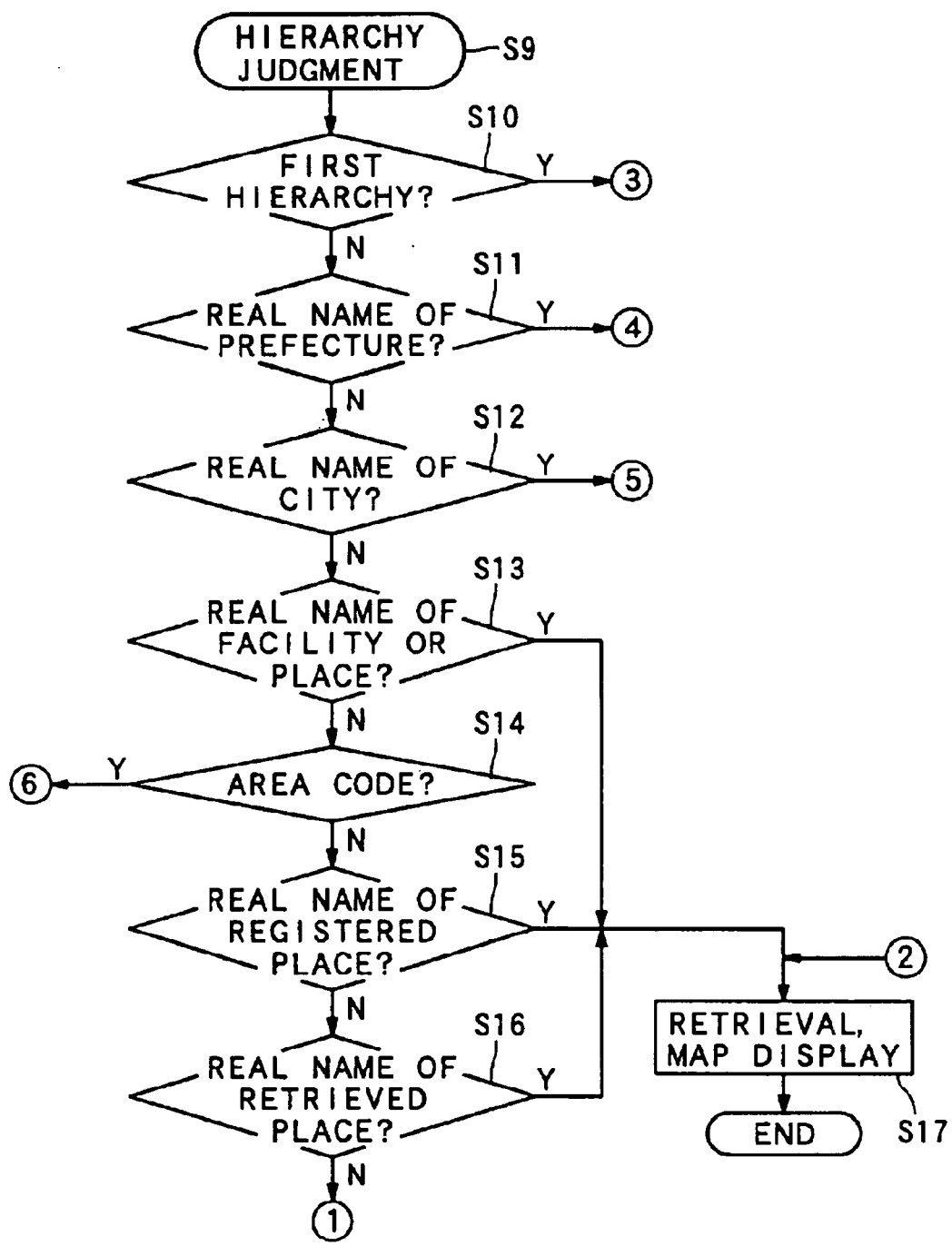
FIG. 4 is a flowchart showing a hierarchy judgement routine in the information retrieving process of the invention.

Next, the hierarchy judgment at the step S9 will be described in detail with reference to FIG. 4.

In the hierarchy judging process at the step S9, at first, a judgment is made as to whether or not the response at the step S5 is the word included in the first hierarchy 40 in the recognition words W (step S10). If the response is the word included in the first hierarchy 40 (step S10; YES), the sequence goes to step S20 described later.

On the contrary, if the response is not the word included in the first hierarchy 40 (Step S10; NO) in the judgment at step S11, a judgment is made as to whether or not the response at step S5 is a real name representing a prefecture (for example, Tokyo", "Kanagawa" or the like) (step S11).

If the response is a real name representing the prefecture (step S11; YES), the sequence goes to step S32 described later. If the response is not a real name representing a prefecture (step S11; NO), a judgment is made as to whether or not the response at step S5 is a real name representing a city name (for example, "Shinagawa-Ku", "Yokohama-Shi" or the like) (step S12).

If the response is a real name representing a city (step S12; YES), the sequence goes to step S73. If the response is not a real name representing a city (step S12; NO), a judgment is made as to whether or not the response at S5 is a real name representing the facilities or places (for example, "Tokyo Dome", "Yokohama Stadium" or the like) (step S13).

If the response is a real name representing the facilities or places (step S13; YES), in order to display a map where the facility or place exists, a map including the facility or place is retrieved, and map data corresponding to the retrieved map are read out from the DVD-ROM disk DK and displayed (step S17). Then, the process is ended.

On the other hand, if the response at S5 is neither a facility name nor a place name in the judgment at step S13 (step S13: NO), a judgment is made as to whether or not the response at S5 is a number (numeral) representing an area code of a telephone number (for example, "03", "045" or the like) (step S14).

If the response is a number representing an area code (step S14, YES), the sequence goes to step S51. If the response is not a number representing an area code (step S14; NO), a judgment is made as to whether or not the response at S5 is a real name representing the destination spot registered previously (for example "China town", "Roppongi" or the like) (step S15).

If the response is the registered destination spot name (step S15, YES), the sequence goes to step S17 so that a map is retrieved and displayed. If the response is not the registered destination spot name (step S15; NO), a judgment is made as to whether or not the response at S5 is a real name representing the place which has been recently retrieved and stored (step S16).

If the response is the recently retrieved place (step S16; YES), the sequence goes to step S17 so that a map is retrieved and displayed. If the response is not the retrieved place (step S16; NO), the sequence goes to step S6 so that the aforementioned process is repeated.

Next, the description will be given of a process executed when the judgement in step S10 results in that the response at step S5 is a content included in the first hierarchy 40, with reference to FIG. 5.

Figure 5:
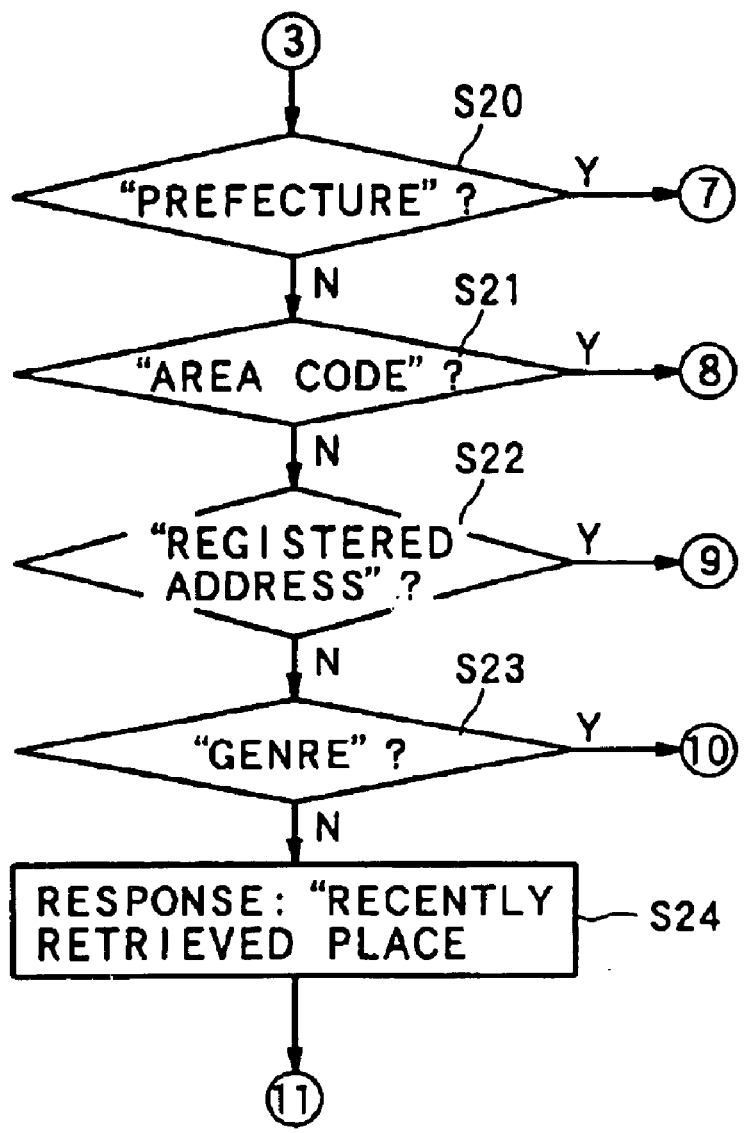
FIG. 5 is a flowchart showing a following part of the routine shown in FIG. 4.

As shown in FIG. 5, if the response at S5 is a content included in the first hierarchy 40 in the judgment at step S10 (step S10; YES), a judgment is made as to whether or not the response is the word "Prefecture" (step S20). If the response is the word "Prefecture" (step S20; YES), the sequence goes to S25 described later.

On the other hand, if the response is not the word "Prefecture" (step S20; NO), a judgment is made as to whether or not the response at S5 is the word "Area code" (step S21). If the response is the word "Area code" (step S21; YES), the sequence goes to step S47 described later.

If the response is not the word "Area code" (step S21; NO), a judgment is made as to whether or not the response at S5 is the word "Registered address" (step S22). If the response is the word "Registered address" (step S22; YES), the sequence goes to S90 described later.

If the response is not the word "Registered address" (step S22; NO), a judgment is made as to whether or not the response at S5 is the word "Genre" (step S23). If the response is the word "Genre" (step S23; YES), the sequence goes to step S59 described later.

If the response is not the word "Genre" (step S23; NO), a judgment is made that the response at S5 is "Recently retrieved place" (step S24), and the sequence goes to step S100 described later.

Next, the description will be given of a process in the case where the response at step S5 is the word "Prefecture" in the above step S20 with reference to FIG. 6.

Figure 6:
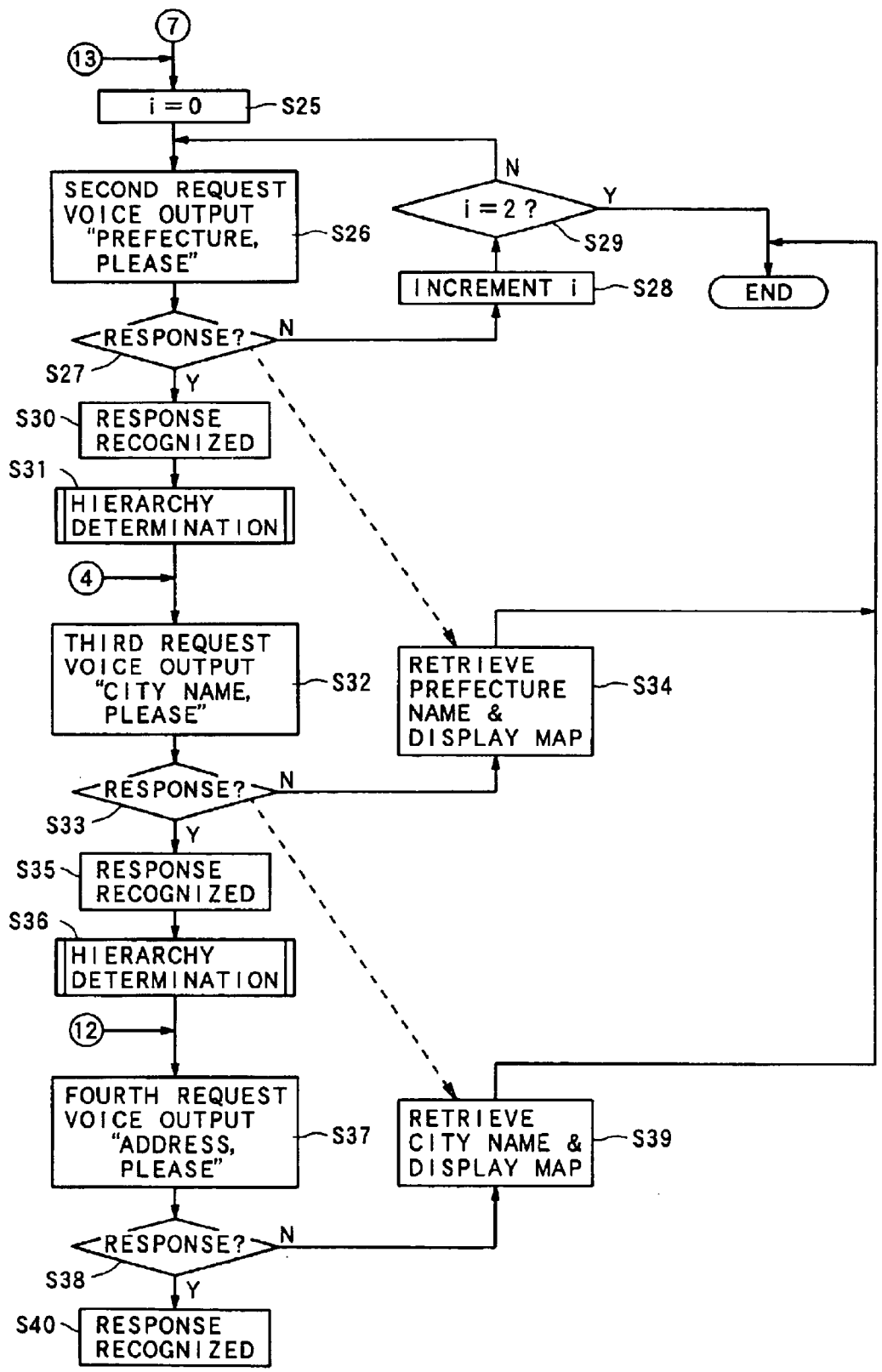
FIG. 6 is a flowchart showing a following part of the routine shown in FIG. 5.

As shown in FIG. 6, if the response at step S5 is the word "Prefecture" in the judgment at step S20 (step S20; YES), a parameter i, which represents a number of times that the request message "Prefecture, please." is outputted, is initialized (step S25), and the second request voice "Prefecture, please." is outputted through the speaker 23 (step S26).

Then, a judgment is made as to whether or not a response is made (step S27). If no response is made for a predetermined time (step S27; NO), the parameter i is incremented only by one (step S28), and a judgment is made as to whether or not the value of the increased parameter i is "2" (step S29). If the value is "2" (step S29; YES), this means that a response is not made even after the request message "Prefecture, please." is outputted twice. Therefore, a judgment is made that the driver does not want to retrieve information so that the process is ended.

On the other hand, if the parameter i is not "2" in the judgment at step S29, the sequence returns to step S26 in order to again output the request message "Prefecture, please.".

If a response is made to the request message "Prefecture, please." in the judgment at step S27 (step S27; YES), the response is recognized by the voice recognition decoder 21 (step S30), and the hierarchy of the recognized content is determined (step S31). The detailed process at step S31 will be described later.

When the hierarchy of the response content recognized at step S30 is determined, the third request voice "City name, please." is outputted through the speaker 23 (step S32).

Then, a judgment is made as to whether or not a response is made (step S33). If no response is made for a predetermined time (step S33; NO), a map including the city represented by the word is retrieved based on the word representing the city name in the content recognized at step S30, and map data corresponding to the retrieved map are read out from the DVD-ROM disk DK and displayed (step S34). Then, the process is ended.

On the other hand, if a response is made to the request message "City name, please." in the judgment at step S33 (step S33; YES), the response is recognized by the voice recognition decoder 21 (step S35), and the hierarchy of the recognized content is determined (step S36). The detailed process at step S36 will also be described later.

If the hierarchy of the response content recognized at step. S35 is determined, the fourth request voice "Address, please." is outputted through the speaker 23 (step S37).

Then, a judgment is made as to whether or not a response is made (step S38). If no response is made for a predetermined time (step S38; NO), a map including the city represented by the word is retrieved based on the word representing the city in the content recognized at step S35, and map data corresponding to the retrieved map are read out from the DVD-ROM disk DK and displayed (step S39). Then, the process is ended.

On the other hand, if a response is made to the request message "Address, please." in the judgment at step S38 (step S38; YES), the response is recognized by the voice recognition decoder 21 (step S40), and the sequence goes to step S17 so that the map data are retrieved and displayed based on the recognized content.

Figure 7A:
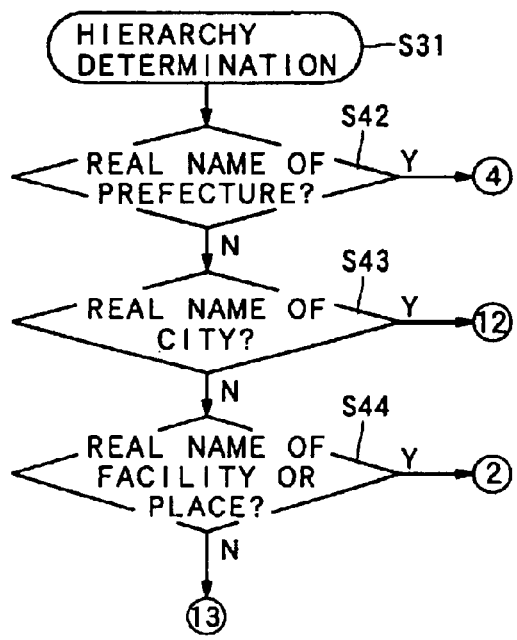
FIGS. 7A and 7B are flowcharts showing hierarchy determination routine in the information retrieving process of the invention.
Figure 7B:
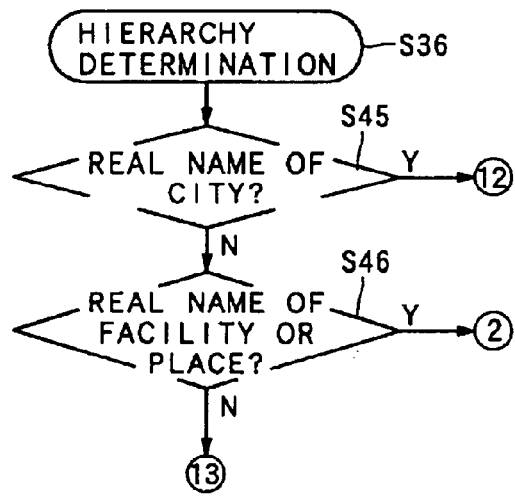

Next, the description will be given of the content of the hierarchy determination process at the steps S31 and S36 with reference to FIGS. 7A and 7B.

At first, the description will be given as to the content of the hierarchy determination process at step S31 with reference to FIG. 7A. First, a judgment is made as to whether or not the response at step S27 is a real name representing a prefecture (step S42). If the response is a real name representing the prefecture (step S42; YES), the sequence goes to step S32 so that the aforementioned operation is repeated. On the other hand, if the response is not a real name presenting a prefecture (step S42: NO), a judgment is made as to whether or not the response at step S27 is a real name representing a city name (step S43). If the response is a real name representing a city name (step S43; YES), the sequence goes to step S37 so that the aforementioned operation is repeated. On the other hand, if the response is not a real name representing a city name (step S43; NO), a judgment is made as to whether or not the response at step S27 is a real name representing a facility name or a place name (step S44). If the response is a real name representing a facility name or a place name (step S44; YES), the sequence goes to step S17 so that map data are retrieved based on the facility name or the place name, and a corresponding map is displayed. If the response is not a real name representing a facility name or a place name (step S44; NO), the sequence goes to step S25 so that the aforementioned operation is repeated.

Next, the description will be given as to the content of the hierarchy determination process at step S36 with reference to FIG. 7B. At first, a judgment is made as to whether or not the response at step S33 is a real name representing a city name (step S45). If the response is a real name representing a city name (step S45; YES), the sequence goes to step S37 so that the aforementioned operation is repeated. If the response is not a real name representing a city name (step S45; NO), a judgment is made as to whether or not the response at step S33 is a real name representing a facility name or a place name (step S46). If the response is a real name representing a facility name or a place name (step S46; YES), the sequence goes to step S17 so that map data are retrieved based on the facility name or the place name, and a corresponding map is displayed. On the other hand, if the response is not a real name representing a facility name or a place name (step S46; NO), the sequence goes to step S25 so that the aforementioned operation is repeated.

Next, the description will be given of the process executed when it is determined in step S21 that the response at step S5 is the word "Area code", with reference to FIG. 8.

Figure 8:
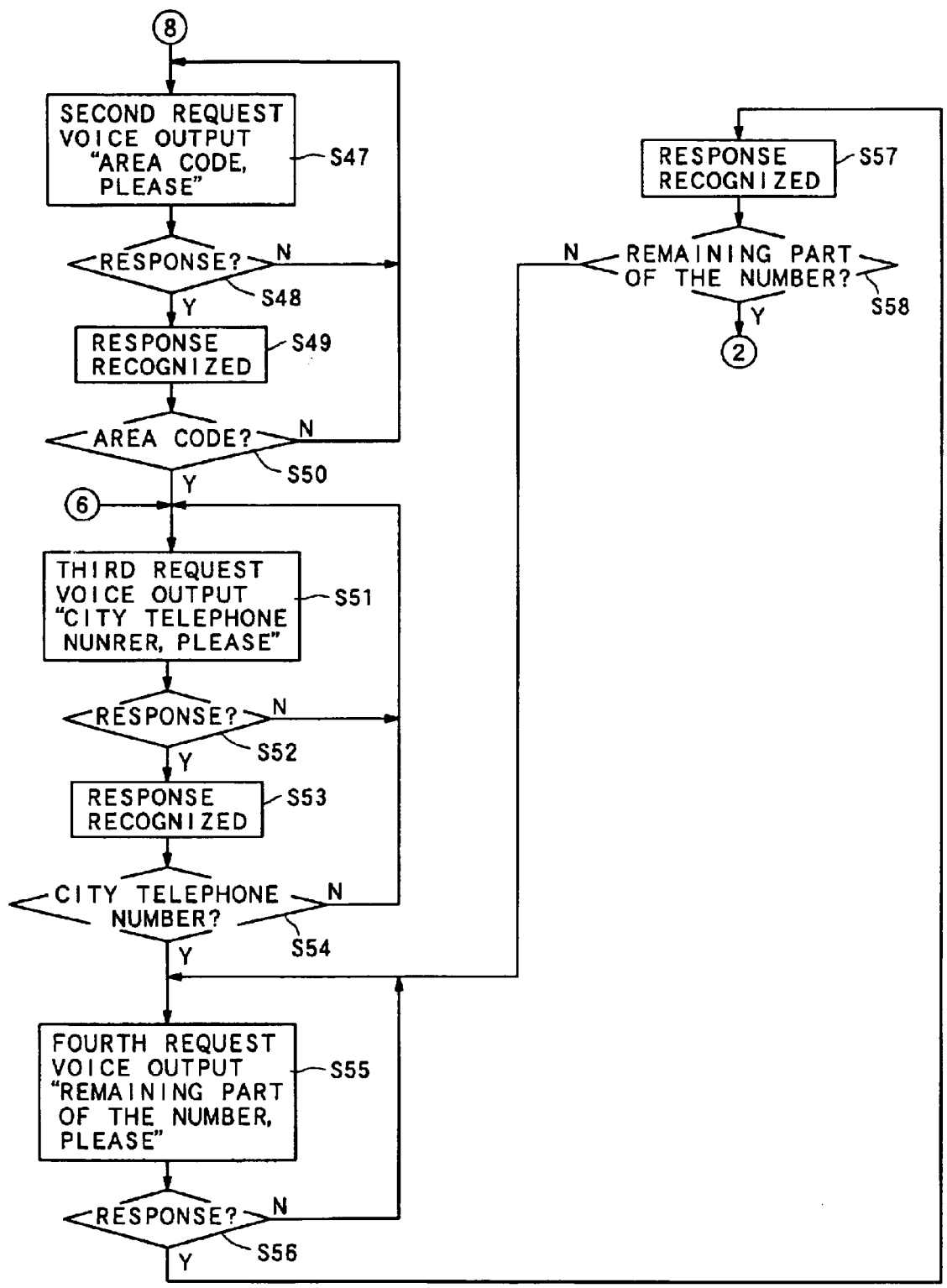
FIG. 8 is another flowchart showing a following part of the routine shown in FIG. 5.

As shown in FIG. 8, if the response at step S5 is the word "Area code" in the judgment at step S21 (step S21; YES), the first request voice "Area code, please." is outputted through the speaker 23 (step S47).

Then, a judgment is made as to whether or not a response is made (step S48). If no response is made for a predetermined time (step S48; NO), the sequence again returns to step S47 so that the first request voice "Area code, please." is outputted. If a response is made (step S48; YES), the response is recognized by the voice recognition decoder 21 (step S49), and a judgment is made as to whether or not the recognized content is an area code (step S50).

If the content is not an area code (step S50; NO), the sequence again returns to step S47 so that the second request voice "Area code, please." is outputted. If the content is an area code (step S50; YES), the third request voice "City telephone number, please." is outputted through the speaker 23 (step S51).

Then, a judgment is made as to whether or not a response is made (step S52). If no response is made for a predetermined time (step S52; NO), the sequence again returns to step S51 so that the third request voice "City telephone number, please." is outputted. When a response is made (step S52; YES), the response is recognized by the voice recognition decoder 21 (step S53), and a judgment is made as to whether or not the recognized content is a city telephone number (step S54).

If the content is not a city telephone number (step S54; NO), the sequence again returns to step S51 so that the third request voice "City telephone number, please." is outputted. If the content is a city telephone number (step S54; YES), the fourth request voice "Remaining part of the phone number, please." is outputted through the speaker 23 (step S55).

Then a judgment is made as to whether or not a response is made (step S56). If no response is made for a predetermined time (step S56: NO), the sequence again returns to step S55 so that the fourth request voice "Remaining part of the phone number, please." is outputted. If a response is made (step S56; YES), the response is recognized by the voice recognition decoder 21 (step S57), and a judgment is made as to whether or not the recognized content is the remaining part of the number (step S58).

If the content is not the remaining part of the number (step S58; NO), the sequence again returns to step S55 so that the fourth request voice "Remaining part of the number, please." is outputted. If the content is the remaining part of the number (step S58; YES), the sequence returns to step S17 so that map data are retrieved based on the inputted telephone number (steps S48, S52 and S56) and a corresponding map is displayed.

Next, the description will be given of the process executed when it is determined at the step S23 that the response at step S5 is the word "genre name", with reference to FIG. 9.

Figure 9:
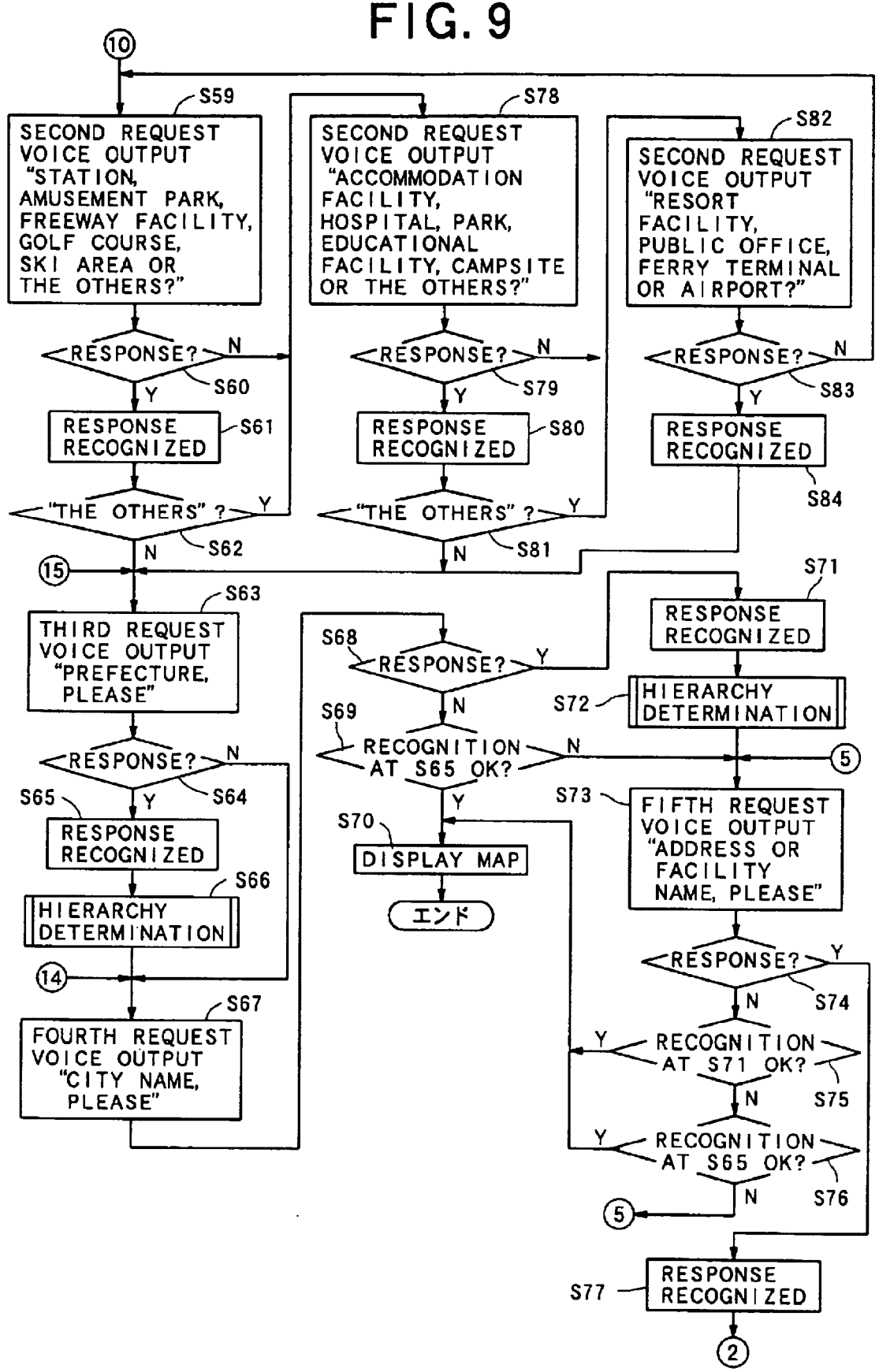
FIG. 9 is still another flowchart showing a following part of the routine shown in FIG. 5.

As shown in FIG. 9, if the response at step S5 is the word "Genre" in the judgment at step S23 (step S23; YES), the first segment of the second request voice corresponding to the genre name "Station, amusement park, freeway, golf course, ski area or the others ?" is outputted through the speaker 23 (step S59).

Then, a judgment is made as to whether or not a response is made (step S60). If no response is made for a predetermined time (step S60; NO), the sequence goes to step S78 described later.

If a response is made in the judgment at step S60 (step S60; YES), the response is recognized by the voice recognition decoder 21 (step S61), and a judgment is made as to whether or not the recognized content is the word "The others" (step S62). If the content is the word "The others" (step S62; YES), the second segment of the second request voice corresponding to the genre name "Accommodation facility, hospital, educational facility, park, campsite, or the others ?" is outputted through the speaker 23 (step S78).

Then, a judgment is made as to whether or not a response is made (step S79). If no response is made for a predetermined time (step S79; NO), the sequence goes to step S82 described later.

If a response is made in the judgment at step S79 (step S79: YES), the response is recognized by the voice recognition decoder 21 (step S80), and a judgment is made as to whether or not the recognized content is the word "The others" (step S81). If the content is the word "The others" (step S81; YES), the third segment of the second request voice corresponding to the genre name "Resort facility, public office, ferry terminal or airport?" is outputted through the speaker 23 (step S82).

Then, a judgment is made as to whether or not a response is made (step S83). If no response is made for a predetermined time (step S83; NO), the sequence returns to the step S59 so that the aforementioned operation is repeated.

If a response is made in the judgment at step S83 (step S83; YES), the response is recognized by the voice recognition decoder 21 (step S84), and the sequence goes to step S63.

If the recognized content is not the word "The others" in the judgment at step S62 or S81 (step S62; N0 or S81; NO), the third request voice "Prefecture, please." is outputted through the speaker 23 (step S63).

Then, a judgment is made as to whether or not a response is made (step S64). If no response is made for a predetermined time (step S64; NO), the sequence goes to step S67. If a response is made (step S64; YES), the response is recognized by the voice recognition decoder 21 (step S65), and the hierarchy of the recognized content is determined (step S66). The detailed process at step S66 will be described later.

If the hierarchy of the response content recognized at step S66 is determined, the fourth request voice "City name, please." is outputted through the speaker 23 (step S67).

Then, a judgment is made as to whether or not a response is made (step S68). If a response is made (step S68; YES), the response is recognized by the voice recognition decoder 21 (step S71), and the hierarchy of the recognized content is determined (step S72). The detailed process at step S72 will be described later.

On the other hand, if a response is not made for a predetermined time in the judgment at step S68 (step S68; NO), a judgment is made as to whether or not that the response is recognized at the step S65 (step S69). If the response is recognized (step S69; YES), a map including the city represented by the word is retrieved based on the recognized word representing the city name, and map data corresponding to the retrieved map are read out from the DVD-ROM disk DK so as to be displayed (step S70). Then, the process is ended.

On the other hand, if the response is not recognized in the judgment at step S69 or the hierarchy determination is completed at step S72, the fifth request voice "Address or facility name, please." is outputted through the speaker 23 (step S73).

Then, a judgment is made as to whether or not a response is made (step S74). If no response is made for a predetermined time (step S74; NO), a judgment is made as to whether or not the response is recognized at the step S71 (step S75). If the response is recognized (step S75; YES), a map including the city represented by the word is retrieved based on the recognized word representing the city name, and map data corresponding to the retrieved map are read out from the DVD-ROM disk DK and displayed (step S70). Then, the process is ended.

On the other hand, if the response is not recognized in the judgment at step S75 (step S75; NO), a judgment is made as to whether or not the response is recognized at the step S65 (step S76). If the response is recognized (step S76; YES), a map including the city represented by the recognized word is retrieved based on the word representing the city name, and map data corresponding to the retrieved map are read out from the DVD-ROM disk DK and displayed (step S70). Then, the process is ended.

If the response is not recognized in the judgment at step S76 (step S76; NO), the sequence returns to the step S73 so that the aforementioned operation is repeated.

Further, if a response is made in the judgment at step S74 (step S74; YES), the response is recognized by the voice recognition decoder 21 (step S77), and the sequence returns to step S17 so that map data are retrieved based on the inputted address or facility name and a corresponding map is displayed.

Figure 10A:
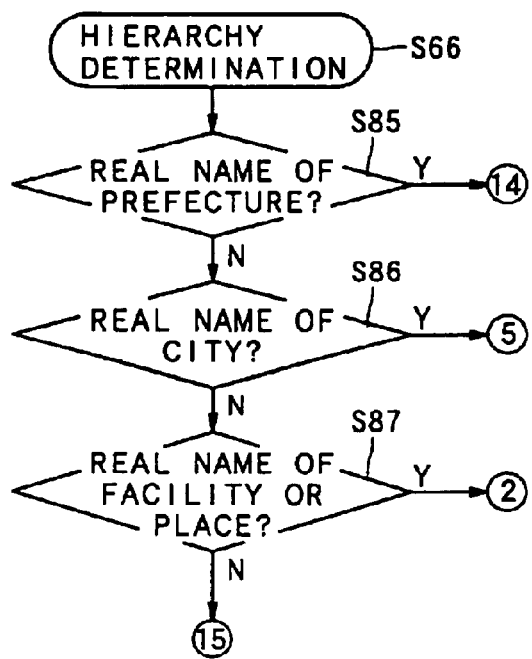
FIGS. 10A and 10B are flowcharts showing hierarchy determination routine in the information retrieving process of the invention.
Figure 10B:
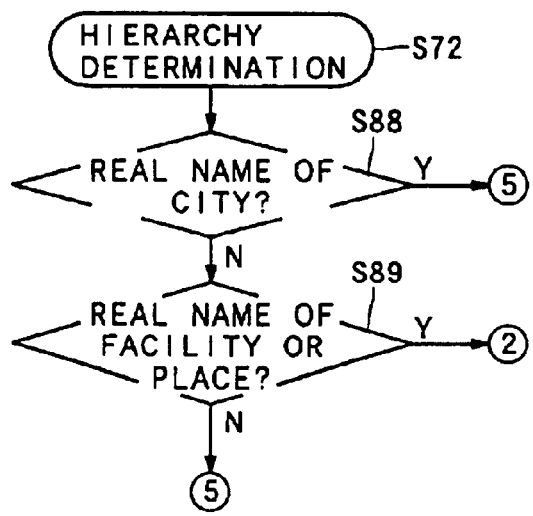

Next, the content of the hierarchy determination process at the steps S66 and S72 will be described with reference to FIGS. 10A and 10B.

At first, the description will be given as to the content of the hierarchy determination process at step S66 with reference to FIG. 10A. First, a judgment is made as to whether or not the response at step S64 is a real name representing a city, town or village name (step S85). If the response is a real name representing a city name (step S85; YES), the sequence goes to step S67 so that the aforementioned operation is repeated. On the other hand, if the response is not a real name representing a city name (step S85; NO), a judgment is made as to whether or not the response at step S64 is a real name representing a city name (step S86). If the response is a real name representing a city name (step S86; YES), the sequence goes to step S73 so that the aforementioned operation is repeated. If the response is not a real name representing a city name (step S86; NO), a judgment is made as to whether or not the response at step S64 is a real name representing a facility name or a place name (step S87). If the response is a real name representing a facility name or a place name (step S87; YES), the sequence goes to step S17 so that map data are retrieved based on the facility or place name and a corresponding map is displayed. If the response is not a real name representing the a facility name or a place name (step S87; NO), the sequence goes to step S63 so that the aforementioned operation is repeated.

Next, the description will be given as to the content of the hierarchy judging process at step S72 with reference to FIG. 10B. At first, a judgment is made as to whether or not the response at step S68 is a real name representing a city name (step S88). If the response is a real name representing a city name (step S88; YES), the sequence goes to step S73 so that the aforementioned operation is repeated. On the other hand, if the response is not a real name representing a city name (step S88: NO), a judgment is made as to whether or not the response at step S68 is a real name representing a facility name or a place name (step S89). If the response is a real name representing a facility name or a place name (step S89; YES), the sequence goes to step S17 so that map data are retrieved based on the facility or place name and a corresponding map is displayed. If the response is not a real name representing a facility name or a place names (step S89; NO), the sequence goes to step S73 so that the aforementioned operation is repeated.

Next, the process executed when it is determined at the step S22 that the response at step S5 is a word "Registered address" will be described with reference to FIG. 11.

Figure 11:
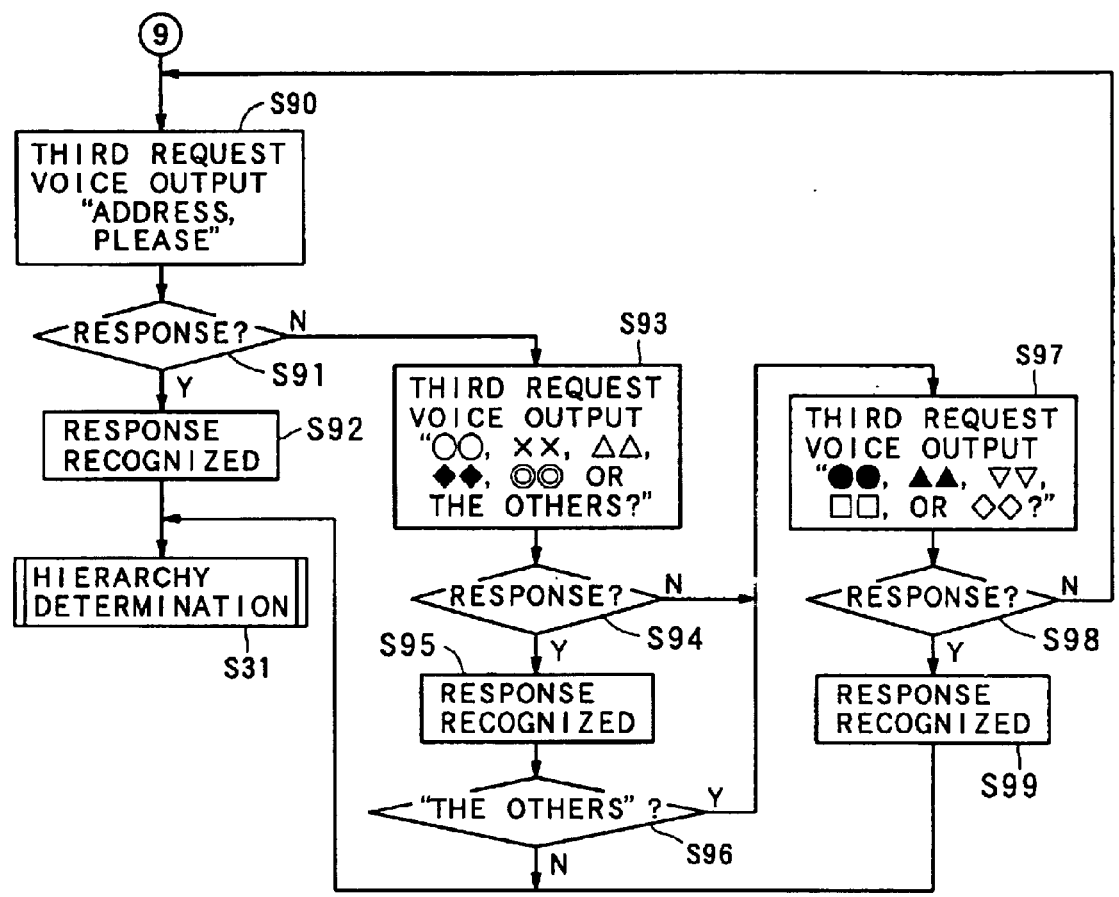
FIG. 11 is still another flowchart showing a following part of the routine shown in FIG. 5.

As shown in FIG. 11, if the response at step S5 is the word "Registered address" (step S22; YES), the second request voice "Address, please." is outputted through the speaker 23 (step S90).

Then, a judgment is made as to whether or not a response is made (step S91). If no response is made for a predetermined time (step S91; NO), the sequence goes to step S93 described later. On the other hand, if a response is made (step S91: YES), the response is recognized by the voice recognition decoder 21 (step S92), and the hierarchy determination process similar to step S31 is executed.

On the other hand, if no response is made for a predetermined time in the judgment at step S91 (step S91; NO), the first segment of the third request voice corresponding to the registered address "○○, ✗✗, △△, ◆◆, ⊙⊙, or the others ?" is outputted through the speaker 23 (step S93). Then, a judgment is made as to whether or not a response is made (step S94). If no response is made for a predetermined time (step S94; NO), the sequence goes to step S97 described later.

If a response is made in the judgment at step S94 (step S94; YES), the response is recognized by the voice recognition decoder 21 (step S95), and a judgment is made as to whether or not the recognized content is the word "The others" (step S96).

If the content is not the word "The others" (step S96; NO), the sequence goes to step S31. If the content is the word "The others" (step S96; YES), the second segment of the third request voice corresponding to the registered address "●●, ▲▲, ▽▽, □□, or ◇◇?" is outputted through the speaker 23 (step S97).

Then, a judgment is made as to whether or not a response is made (step S98). If no response is made for a predetermined time (step S98; NO), the sequence returns to the step S90 so that the aforementioned operation is repeated.

If a response is made in the judgment at step S98 (step S98: YES), the response is recognized by the voice recognition decoder 21 (step S99), and the hierarchy determination at step S31 is executed.

Next, the process to be executed after the process at the step S24 will be described with reference to FIG. 12.

Figure 12:
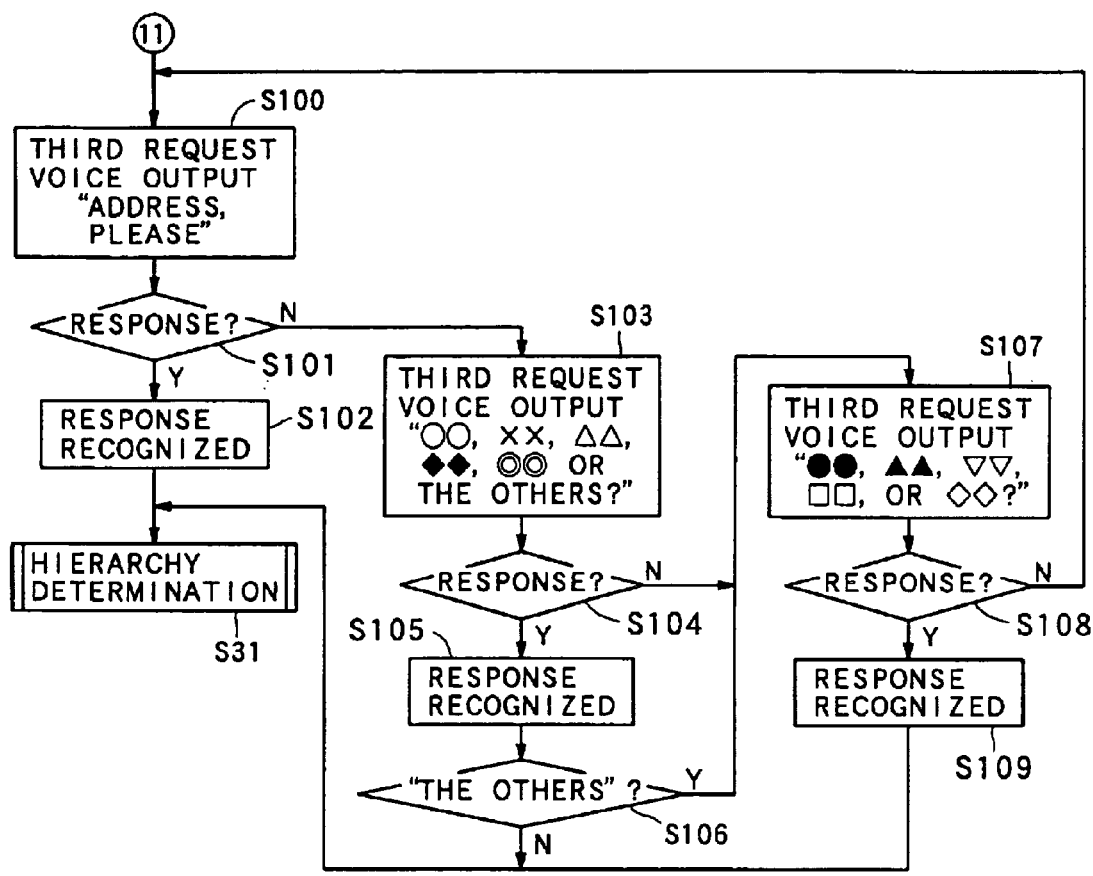
FIG. 12 is still another flowchart showing a following part of the routine shown in FIG. 5.

As shown in FIG. 12, if a judgment is made at step S24 that the response at step S5 is the word "Recently retrieved address", the second request voice "Address, please. "is outputted through the speaker 23 (step S100).

Then, a judgment is made as to whether or not a response is made (step S101). If no response is made for a predetermined time (step S101; NO), the sequence goes to step S103 described later. On the other hand, if a response is made (step S101; YES), the response is recognized by the voice recognition decoder 21 (step S102), and the hierarchy determination process similar to that at the step S31 is executed.

If no response is made for a predetermined time in the judgment at step S101 (step S101; NO), the first segment of the third request voice corresponding to the recently retrieved place "○○, χχ, ΔΔ, ♦♦, ☺☺, or the others?" is outputted through the speaker 23 (step S103).

Then, a judgment is made as to whether or not a response is made (step S104). If no response is made for a predetermined time (S104; NO), the sequence goes to step S107 described later.

If a response is made in the judgment at step S104 (step S104; YES), the response is recognized by the voice recognition decoder 21 (step S105), and a judgment is made as to whether or not the recognized content is the word "The others" (step S106). If the content is not the word "The others" (step S106; NO), the sequence goes to step S31. If the content is the word "The others" (step S106; YES), the second segment of the third request voice corresponding to the recently retrieved place "●●, ▲▲, ▽▽, □□ or ◇◇?" is outputted through the speaker 23 (step S107).

Then, a judgment is made as to whether or not a response is made (step S108). If no response is made for a predetermined time (step S108; NO), the sequence returns to the step S100 so that the aforementioned operation is repeated.

If a response is made in the judgment at step S108 (step S108; YES), the response is recognized by the voice recognition decoder 21 (step S109), and the aforementioned hierarchy judgment at step S31 is executed.

As described above, according to the information retrieval process executed in the vehicle navigation device S of the invention, since a hierarchy of inputted voice information is judged and a destination spot is retrieved based on the judged hierarchy, it is possible to retrieve the destination spot in the order of hierarchies, or to retrieve the destination spot while skipping one or plural hierarchies and shifting from a hierarchy to a hierarchy, for example.

In addition, the respective recognition words W belonging to the n+1 (n: natural number in a range of 2 to 4) hierarchy are associated with only one of the recognition words W included in the n hierarchy. Namely, if the recognition words W in the upper hierarchies are different, the candidate information of 1 recognition words W in the lower hierarchy are different. Therefore, the hierarchical structure can be constituted to include plural types of recognition words W.

Further, if a judgment is made that the hierarchy of voice information inputted in response to the request message SM in the p-th hierarchy (p: natural numbers not more than 5) is the p-th hierarchy, the request message SM for inputting voice information belonging to the (p+1)-th hierarchy is outputted through the speaker 23. If a judgment is made that the hierarchy of the voice information inputted in response to the request message SM in the p-th hierarchy is (p+q)-th (p+q: natural numbers not more than 4) hierarchy, the request message SM for inputting voice information belonging to (p+q+1)-th hierarchy is outputted through the speaker 23. Therefore, a destination spot can be retrieved in the order of the hierarchy structure, or a destination spot can be retrieved while skipping one or plural hierarchies.

Furthermore, if voice information belonging to a hierarchy represented by an outputted request message SM is not inputted, a request message SM for requesting the input of voice information in one-level lower hierarchy with respect to the former request message SM is outputted. As a result, a desired destination spot can be retrieved quickly.

In addition, since recognition word W belonging to the third hierarchy 42 corresponding to the registered address or recently retrieved address is divided into plural segments to be outputted, a time required for outputting one request message SM can be shortened. Moreover, desired voice information can be inputted without the need to output a request message SM corresponding to all the recognition words W belonging to one hierarchy.

Further, since information can be inputted and outputted by a voice, the convenience of the information retrieval process is further improved.

In addition, in the recognition words W shown in FIG. 2, if one recognition word W in the first hierarchy 40 is selected, for example, voice input is waited for the recognition words belonging to the hierarchies not higher than the second hierarchy 41 by using only the recognition words W associated with the recognition words W in the first hierarchy 40. As a result, a number of the recognition words W for waiting can be reduced, and erroneous recognition of responses can be avoided.

Further, as for the recognition words W in each hierarchy, their frequency of use may be recorded, and recognition words W, which are used more frequently, may have priority in use for waiting, or recognition words W, whose content is closer to the contents of recognition words W currently used for waiting, may have priority in use for the recognition of responses. As a result, a number of the recognition words W used in recognizing the responses may be further reduced, and erroneous recognition of responses can be further reduced.

Here, the above embodiment described the case where the present invention is applied to the vehicle navigation device S, but the present invention can also be applied to an aircraft navigation device and a vessel navigation device.

What is claimed is:

1. An information retrieving apparatus for retrieving target information from a plurality of candidates, comprising:

storage means for storing the plurality of candidates in a hierarchical structure including m hierarchies (m being a natural number not less than 2);

output means for outputting a message which requests a user to input a reply;

input means for a user to input the reply; and searching means for searching candidates as to a plurality of hierarchies in the hierarchical structure to determine a corresponding candidate to the reply, wherein the next message which requests the user to input the next reply is further output from the output means based on the corresponding candidate until the corresponding candidate becomes the target information.

2. An information retrieving apparatus according to claim 1, wherein the hierarchical structure is arranged such that each candidate belonging to (n+1)-th hierarchy (n being a natural number and n<m−1) is associated with one of the plurality of candidates belonging to n-th hierarchy.

3. An information retrieving apparatus according to claim 1, wherein the output means outputs the next question relating to the (p+1)-th hierarchy if the corresponding candidate belongs to the p-th hierarchy (p being a natural number and p<m−1), while the output means outputs the next message relating to the (p+q+1)-th hierarchy if the corresponding candidate belongs to the (p+q)-th hierarchy (q being a natural number and (p+q)<m−1).

4. An information retrieving apparatus according to claim 3, the searching means further comprising means for expanding candidates searched;

wherein in a case where the corresponding candidates is not found in the p-th hierarchy, the searching means expand the candidates searched so that candidates in the (p+q)-th hierarchy are searched.

5. An information retrieving apparatus according to claim 4, wherein in a case where the corresponding candidates is found in the p-th hierarchy, the searching means does not expand the candidates searched so that candidates in the (p+q)-th hierarchy are not searched.

6. An information retrieving apparatus according to claim 1, wherein the message relates to r-th hierarchy (r being a natural number and r<m−1), and the output means outputs the next message relating to (r+1)-th hierarchy if the input information is not inputted for a predetermined time.

7. An information retrieving apparatus according to claim 1, wherein the r-th hierarchy (r being a natural number and r<m−1) comprises a plurality of groups each including candidates, and the message relates to one of the groups in the r-th hierarchy, and wherein if the input information is not inputted for a predetermined time, the output means outputs the next message relating to other one of the groups.

8. An information retrieving apparatus according to claim 7, wherein the reply is in a form of voice, and the input means comprises a voice recognition means for recognizing the reply.

9. The information retrieving apparatus according to claim 1, wherein the apparatus further comprises information providing means for providing information to the user by performing data processing based on the target information.

10. A method of retrieving target information from a plurality of candidates that compose a hierarchical structure including m hierarchies (m being a natural number not less than 2), the method comprising the steps of:

outputting a message which requests a user to input a reply;

receiving the reply from the user;

searching candidates as to a plurality of hierarchies in the hierarchical structure to determine a corresponding candidate to the reply; and outputting the next message, which further requests the user to input the next reply, based on the corresponding candidate until the corresponding candidate becomes the target information.

11. A method of retrieving target information from a plurality of candidates according to claim 10, wherein the hierarchical structure is arranged such that each candidate belonging to (n+1)-th hierarchy (n being a natural number and n<m−1) is associated with one of the plurality of candidates belonging to n-th hierarchy.

12. A method of retrieving target information from a plurality of candidates according to claim 10, wherein the step of outputting outputs the next question relating to the (p+1)-th hierarchy if the corresponding candidate belongs to the p-th hierarchy (p being a natural number and p<m−1), while the step of outputting outputs the next message relating to the (p+q+1)-th hierarchy if the corresponding candidate belongs to the (p+q)-th hierarchy (q being a natural number and (p+q)<m−1).

13. A method of retrieving target information from a plurality of candidates according to claim 12, the searching means further comprising means for expanding candidates searched;

wherein in a case where the corresponding candidates is not found in the p-th hierarchy, the step of searching expand the candidates searched so that candidates in the (p+q)-th hierarchy are searched.

14. A method of retrieving target information from a plurality of candidates according to claim 13, wherein in a case where the corresponding candidates is found in the p-th hierarchy, the step of searching does not expand the candidates searched so that candidates in the (p+q)-th hierarchy are not searched.

15. A method of retrieving target information from a plurality of candidates according to claim 10, wherein the message relates to r-th hierarchy (r being a natural number and r<m−1), and the step of outputting outputs the next message relating to (r+1)-th hierarchy if the input information is not inputted for a predetermined time.

16. A method of retrieving target information from a plurality of candidates according to claim 10 wherein the r-th hierarchy (r being a natural number and r<−1 comprises a plurality of groups each including candidates, and the message relates to one of the groups in the r-th hierarchy, and wherein if the input information is not inputted for a predetermined time, the step of outputting outputs the next message relating to other one of the groups.

17. The method according to claim 10, wherein the method further comprises the step of providing information to the user by performing data processing based on the target information.

18. A storage medium carrying, in a computer-readable manner, an information retrieving program for retrieving target information from a plurality of candidates that compose a hierarchical structure including m hierarchies (m being a natural number not less than 2), said program controls a computer device to function as:

output means for outputting a message which requests a user to input a reply;

input means for a user to input the reply; and searching means for searching candidates as to a plurality of hierarchies in the hierarchical structure to determine a corresponding candidate to the reply, wherein the next message which requests the user to input the next reply is further output from the output means based on the corresponding candidate until the corresponding candidate becomes the target information.

19. A storage medium according to claim 18, wherein the hierarchical structure is arranged such that each candidate belonging to (n+1)-th hierarchy (n being a natural number and n<m−1) is associated with one of the plurality of candidates belonging to n-th hierarchy.

20. A storage medium according to claim 18, wherein the output means outputs the next question relating to the (p+1)-th hierarchy if the corresponding candidate belongs to the p-th hierarchy (p being a natural number and p<m−1), while the output means outputs the next message relating to the (p+q+1)-th hierarchy if the corresponding candidate belongs to the (p+q+1)-th hierarchy (q being a natural number and (p+q)<m−1).

21. A storage medium according to claim 20, the searching means further comprising means for expanding candidates searched;

wherein in a case where the corresponding candidates is not found in the p-th hierarchy, the searching means expand the candidates searched so that candidates in the (p+q)-th hierarchy are searched.

22. A storage medium according to claim 21, wherein in a case where the corresponding candidates is found in the p-th hierarchy, the searching means does not expand the candidates searched so that candidates in the (p+q)-th hierarchy are not searched.

23. A storage medium according to claim 18, wherein the message relates to r-th hierarchy (r being a natural number and r<m−1), and the output means outputs the next message relating to (r+1)-th hierarchy if the input information is not inputted for a predetermined time.

24. A storage medium according to claim 18, wherein the r-th hierarchy (r being a natural number and r<m−1) comprises a plurality of groups each including candidates, and the message relates to one of the groups in the r-th hierarchy, and wherein if the input information is not inputted for a predetermined time, the output means outputs the next message relating to other one of the groups.

25. The storage medium according to claim 18, wherein the program controls the computer device to cause the input means to recognize the reply in a form of voice.

26. The storage medium according to claim 18, wherein the program controls a computer device to further function as information providing means for providing information to the user by performing data processing based on the target information.

27. A computer data signal embodied in a carrier wave and representing instructions executed by a computer system to retrieve target information from a plurality of candidates that compose a hierarchical structure including m hierarchies (m being a natural number not less than 2), comprising the instructions for:

outputting a message which requests a user to input a reply;

receiving the reply from the user;

searching candidates as to a plurality of hierarchies in the hierarchical structure to determine a corresponding candidate to the reply; and outputting the next message, which further requests the user to input the next reply, based on the corresponding candidate until the corresponding candidate becomes the target information.

* * * * *